United States Patent
Saito et al.

(10) Patent No.: US 6,337,372 B1
(45) Date of Patent: Jan. 8, 2002

(54) PROPYLENE/PROPYLENE/OLEFIN BLOCK COPOLYMER AND PROCESS FOR PRODUCING THE SAME

(75) Inventors: Jun Saito, Kimitsu; Toshihiro Uwai, Ichihara; Hiroyuki Fujita, Ichihara; Yoshitoyo Yasuda, Ichihara; Tsutomu Ushioda, Ichihara; Tsuyoshi Yahata, Ichihara, all of (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/509,899

(22) PCT Filed: Aug. 3, 1999

(86) PCT No.: PCT/JP99/04168

§ 371 Date: Apr. 3, 2000

§ 102(e) Date: Apr. 3, 2000

(87) PCT Pub. No.: WO00/08080

PCT Pub. Date: Feb. 17, 2000

(30) Foreign Application Priority Data

Aug. 4, 1998 (JP) .......................................... 10-220406

(51) Int. Cl.$^7$ .......................... C08L 33/02; C08L 33/04; C08L 35/02; C08L 45/00; C08F 297/08
(52) U.S. Cl. ...................... 525/191; 525/210; 525/221; 525/222; 525/232; 525/239; 525/240; 525/241
(58) Field of Search ................................. 525/191, 210, 525/221, 222, 232, 239, 240, 241

(56) References Cited

U.S. PATENT DOCUMENTS 5,874,505 A * 2/1999 Saito et al. .................. 525/240

FOREIGN PATENT DOCUMENTS

| JP | 4-337308 | 11/1992 |
|----|----------|---------|
| JP | 5-202152 | 8/1993 |
| JP | 06-172414 | 6/1994 |
| JP | 6-206921 | 7/1994 |
| JP | 06-287257 | 10/1994 |
| JP | 08-027237 | 1/1996 |
| JP | 8-92337 | 4/1996 |
| JP | 9-316147 | 12/1997 |

* cited by examiner

*Primary Examiner*—Nathan M. Nutter
(74) *Attorney, Agent, or Firm*—McDermott, Will & Emery

(57) ABSTRACT

A process for producing a propylene//propylene/olefin block copolymer, characterized by using as a supported metallocene catalyst a solid product obtained by conducting, in this order, the step (a) of reacting an organic transition metal compound having two crosslinked conjugated π-electron ligands with an aluminoxane in an inert solvent, the step (b) of contacting the reaction product obtained in the step (a) with a finely particulate inorganic support in the presence of an inert solvent at 85 to 150° C., and the step (c) of washing the slurry containing a solid product yielded in the step (b) with an aliphatic hydrocarbon at least twice at −50 to 50° C.; and a propylene//propylene/olefin block copolymer produced by said process.

16 Claims, 2 Drawing Sheets

PROPYLENE//PROPYLENE/OLEFIN BLOCK COPOLYMER AND PROCESS FOR PRODUCING THE SAME

TECHNICAL FIELD

This invention relates to processes for producing propylene//propylene/olefin block copolymers and propylene/propylene/olefin block copolymers produced thereby. More particularly, the invention relates to processes for producing propylene//propylene/olefin block copolymers which comprise a segment A comprising a polymer based on propylene and a segment B comprising a propylene/olefin random copolymer and have improved bulk density, particle morphology, impact resistance, stiffness and transparency, using a catalyst system for an olefin polymerization comprising as a main component a metallocene catalyst having an enhanced polymerization activity, and propylene//propylene/olefin block copolymers produced using the catalyst system.

BACKGROUND ART

Propylene//propylene/olefin block copolymers comprising a polymer segment based on propylene and a propylene/olefin random copolymer segment are excellent in stiffness and impact resistance, and have been used as propylene type copolymers for various moldings in the fields of automobiles, electric home appliances, large size sundry goods or the like.

Such propylene//propylene/olefin block copolymers have been produced by polymerizing propylene with propylene and other olefin(s) than propylene in the presence of a catalyst system which comprises an inorganic transition metal compound catalyst having titanium trichloride, titanium tetrachloride or the mixture thereof supported on a support such as magnesium chloride or the like, in combination with an organoaluminum compound, what is called a Ziegler-Natta catalyst system.

In recent years, many processes of producing propylene//propylene/olefin block copolymers have been proposed which comprise using metallocene catalyst systems comprising an organic transition metal compound having at least one π-electron conjugated ligand, i.e., a metallocene compound in combination with aluminoxane, in place of prior Ziegler-Natta catalyst system. Propylene//propylene/olefin block copolymers produced using these metallocene catalyst systems have various expected uses, because of the balance of stiffness and impact resistance being more improved than block copolymers produced using prior Ziegler-Natta catalyst system.

JPA-4-337308 discloses a process for the production of a propylene//propylene/olefin block copolymer which comprises polymerizing propylene alone or a propylene/ethylene mixture containing up to 6% by weight of ethylene, followed by copolymerizing so as to provide a weight ratio of ethylene units/propylene units in the polymer chain being from 10/90 to 95/5, in the presence of a homogeneous catalyst system comprising a cyclopentadienyl group-containing transition metal compound represented by a specific formula and an organoaluminum compound. JPA-5-202152 and JPA-6-206921 disclose processes for the production of polypropylene molding materials wherein a liquid propylene is polymerized in the first stage in the presence of a homogeneous catalyst system comprising an indenyl group-containing transition metal compound represented by a specific formula and an organoaluminum compound, to produce a crystalline polymer containing at least 95% by weight of polypropylene, and in the second stage propylene and ethylene are copolymerized in solution or in suspension (JPA-5-202152) and in gas phase (JPA-6-206921) in the presence of ethylene, to produce a non-crystalline ethylene/propylene copolymer containing 20–90% by weight of ethylene.

JPA-8-92337 discloses a block copolymer comprising a propylene polymer block with a propylene content of 100–80% by weight and an ethylene content of 0–20% by weight, and a copolymer block with a propylene content of 0–99.9% by weight, an ethylene content of 99.99–0.09% by weight and a polymerizable polyene compound of 0.01–60% by weight. The block copolymer is produced by carrying out the sequential steps of forming the propylene polymer block and forming the copolymer block, in the presence of a homogeneous catalyst system which comprises a transition metal compound catalyst including an inorganic titanium compound and various metallocene compounds and also a compound which reacts with the transition metal compound to form an ion complex, or a homogeneous catalyst system wherein an organometallic compound including an organoaluminum compound is further incorporated in said catalyst system.

JPA-9-316147 discloses a propylene//ethylene/α-olefin block copolymer wherein a polypropylene component and a copolymer component of ethylene/α-olefin of $C_4$ or more are block-copolymerized. The block copolymer is produced by polymerizing the polypropylene component and the ethylene/α-olefin copolymer component in the presence of a homogeneous catalyst system which comprises a transition metal compound having a cyclopentadienyl ring, in combination with at least one compound selected from aluminoxane, a compound which reacts with the transition metal compound to form a stable anion and an organoaluminum compound.

JPA-6-287257 discloses a propylene//propylene/ethylene block copolymer produced by a process wherein propylene alone or propylene and ethylene are polymerized in the first stage under the condition of a propylene concentration in gas phase being 90 mol % or more, and in the second stage propylene and ethylene are copolymerized under the condition of a propylene concentration being less than 90 mol %, in the presence of a catalyst system which comprises a metallocene type transition metal compound, a product prepared by contacting clay, a clay mineral or an ion-exchange lamellar compound and an organoaluminum compound, and if necessary an organoaluminum compound.

JPA-6-172414 discloses a process for the production of a propylene//propylene/ethylene block copolymer which comprises carrying out a first polymerization wherein propylene alone or propylene and ethylene are polymerized in substantially gas phase in the presence of a catalyst system having a cyclopentadienyl ring-containing transition metal compound of a specific formula and aluminoxane supported on an organic porous polymer support, to produce a crystalline homopolymer of propylene or a copolymer of propylene and ethylene with an ethylene content of 5% by weight or less, and a second polymerization wherein propylene, ethylene and at least one comonomer selected from α-olefins of $C_4$–$C_{20}$ are copolymerized so as to provide a polymerization molar ratio of propylene/comonomer being from 0/100 to 80/20.

JPA-8-27237 discloses a process of producing an ethylene/propylene//propylene copolymer which comprises carrying out the polymerization step (1) wherein propylene and at least one comonomer selected from ethylene and α-olefins of $C_4$–$C_{20}$ are copolymerized so that a polymerization ratio in a molar ratio of propylene/comonomer will be in the range from 0/100 to 80/20, in the presence of at least one compound selected from a transition metal compound having a π-conjugated 5-membered ring ligand, aluminoxane, a reaction product of a boron compound and an organoaluminum compound, a Lewis acid and an ionic compound, more specifically a catalyst system having an indenyl series zirconocene and aluminoxane supported on a porous polypropylene support, and then carrying out the polymerization step (2) in the presence of the above catalyst and the polymer prepared in (1) to produce a crystalline propylene homopolymer or a propylene copolymer of propylene with at least one comonomer selected from ethylene and α-olefins of $C_4$–$C_{20}$, the copolymer having a comonomer content of 10% by weight or less.

The above-described references state that the propylene//propylene/olefin block copolymers produced therein have well-balanced stiffness and impact resistance at ordinary temperature and low temperature, the stiffness being evaluated by flexural modulus, etc., and the impact resistance being evaluated by Izod impact strength, etc.

JPA-6-172414 and JPA-8-27237 state that the block copolymers produced therein are improved in particle morphology and bulk density.

Of the above-described techniques, the technique using the homogeneous catalyst is applicable to a solution polymerization process, when industrial production of a propylene//propylene/olefin block copolymer is taken into consideration. However, the application of this technique to a gas phase polymerization process and a slurry polymerization process produces finely divided polymers having an extremely low bulk density. Accordingly, industrial production of a propylene//propylene/olefin block copolymer by both processes is difficult practically. In the process using a supported metallocene catalyst, a polymerization activity of the catalyst improves to some extent, the amount of aluminoxane used as a cocatalyst is reduced, and an improvement in bulk density and particle morphology of the resultant block copolymer is secured. However, further improvement in every aspect has been desired. When an application to a gas phase polymerization is especially taken into consideration, further improvements in polymerization activity of the catalyst, bulk density and particle morphology of the resultant copolymer are demanded.

DISCLOSURE OF THE INVENTION

An object of the present invention is to provide a process for producing a propylene//propylene/olefin block copolymer, which improves a polymerization activity of the catalyst, can reduce the amount of aluminoxane used and produces the block copolymer having improved bulk density and particle morphology, and further, excellent impact strength, stiffness and transparency, and also to provide the propylene//propylene/olefin block copolymer produced by said process.

The present inventors have investigated zealously in an effort to achieve the above object, and found that the use of a catalyst system comprising a specific supported metallocene catalyst and an organoaluminum compound in the two-stage polymerization process of a propylene//propylene/olefin as disclosed in the above references can improve the polymerization activity of the catalyst, and can produce the propylene//propylene/olefin block copolymer having improved bulk density and particle morphology, and further, excellent impact strength, stiffness and transparency, thus leading to completion of the present invention.

The present invention provides a process for producing a propylene//propylene/olefin block copolymer which comprises 20–95% by weight of segment A comprising a polymer based on propylene and 80–5% by weight of segment B comprising a propylene/olefin random copolymer, characterized by carrying out in sequence the following steps (A) and (B):

(A) a first polymerization step wherein propylene or a mixture of propylene and other olefin(s) than propylene is polymerized in the presence of a catalyst system for olefin polymerization comprising a supported metallocene catalyst and an organoaluminum compound, to produce the segment A comprising a polymer based on propylene wherein a weight ratio of units of other olefin(s) than propylene/units of propylene in the polymer chain is from 0/100 to 30/70, and (B) a second polymerization step wherein a mixture of propylene,and other olefin(s) than propylene is copolymerized in the presence of the polymer based on propylene containing the catalyst system for olefin polymerization from the first polymerization step, to produce the segment B comprising the propylene/olefin random copolymer wherein a weight ratio of units of propylene/units of other olefin(s) than propylene in the polymer chain is from 5/95 to 95/5, the supported metallocene catalyst comprising a solid product which is prepared by carrying out in sequence the following steps of:

(a) reacting an aluminoxane with an organic transition metal compound having two π-electron conjugated ligands crosslinked each other in an inert solvent, (b) contacting a reaction product formed in step (a) with an inorganic finely particulate support in an inert solvent at a temperature of 85–150° C., and (c) washing at least two times a slurry containing the solid product formed in step (b) with an aliphatic hydrocarbon at a temperature of −50 to 50° C. The invention also provides the propylene//propylene/olefin block copolymer produced by said process.

Another aspect of the present invention is a process for producing the propylene//propylene/olefin block copolymer in the presence of a preactivated catalyst, instead of the supported metallocene catalyst, and also the propylene//propylene/olefin block copolymer produced by said process, the preactivated catalyst being characterized by comprising a granular product which is prepared by carrying out, subsequent to the above step (c), further step (d) wherein the supported metallocene catalyst prepared in step (c) is contacted with olefin(s) to prepolymerize the olefin(s) and 0.01–100 kg of the olefin prepolymer per kg of the supported metallocene catalyst is further supported.

BEST MODE FOR CARRYING OUT THE INVENTION

Figure 1:
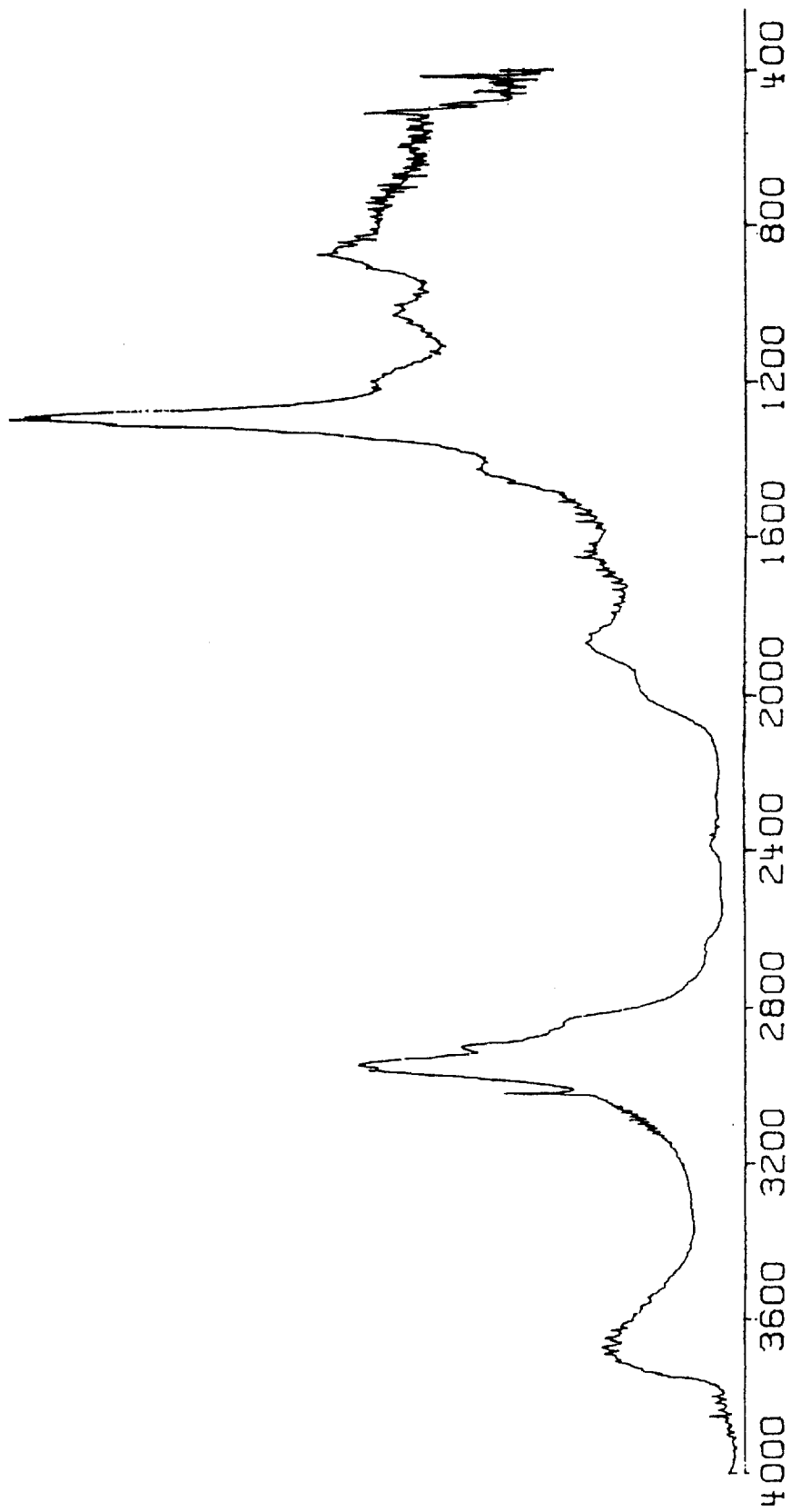
FIG. 1 is IR absorption spectrum of the supported metallocene catalyst used in the present invention.
Figure 2:
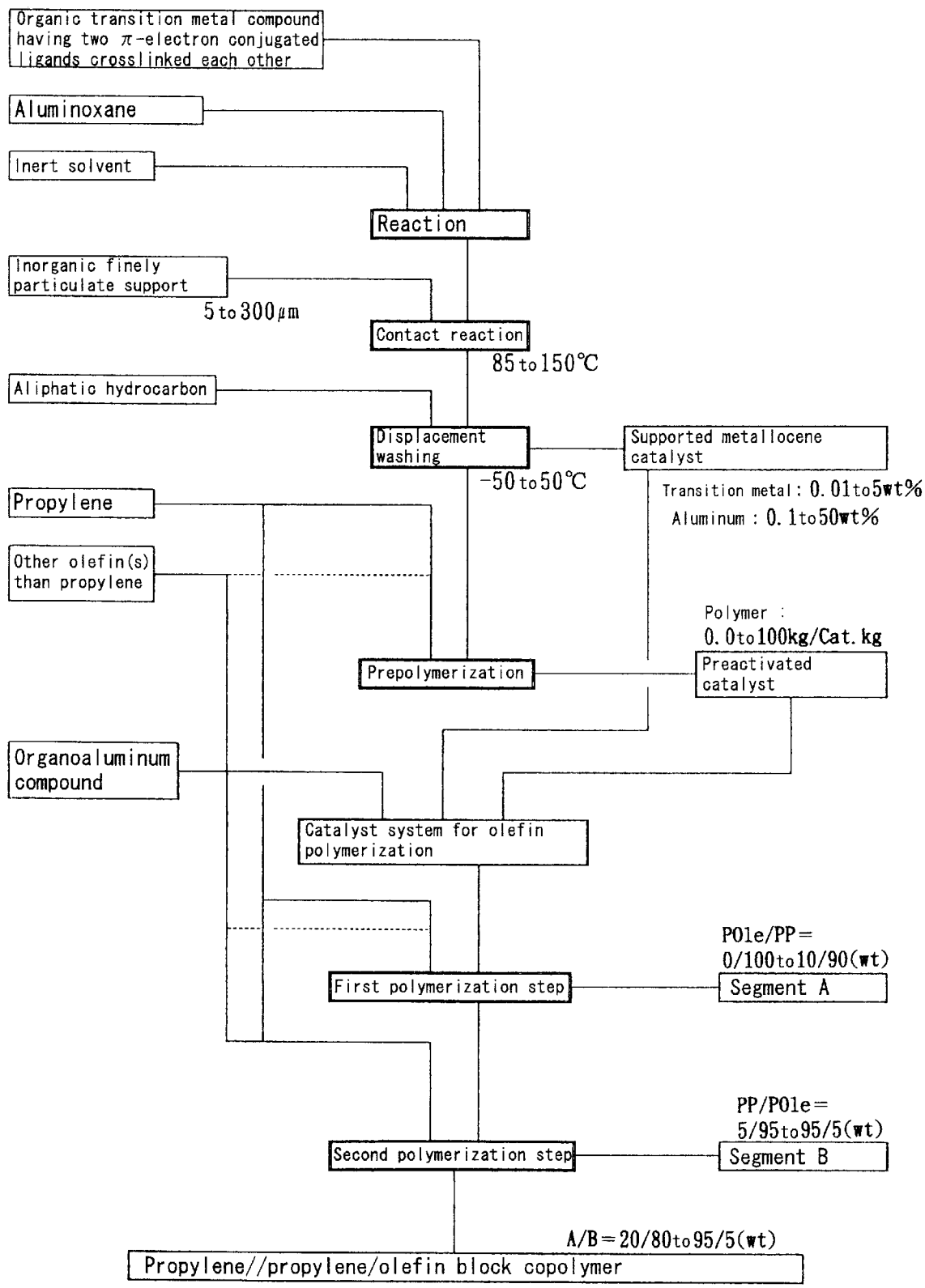
FIG. 2 is a flow sheet illustrating the process for the production of the propylene//propylene/olefin block copolymer according to the present invention.

The present invention is described in detail below.

In the present invention, the propylene//propylene/olefin block copolymers comprise the segment A comprising a polymer based on propylene which is a propylene homopolymer or a propylene/olefin random copolymer wherein a weight ratio of units of other olefin(s) than propylene/units of propylene in the polymer chain is from 0/100 to 30/70 and the segment B comprising a propylene/olefin random copolymer wherein a weight ratio of units of other olefin(s) than propylene/units of propylene in the polymer chain is from 5/95 to 95/5, and they include a AB block copolymer wherein segment A and segment B are bonded by a covalent bond, a weight ratio of segment A/segment B being in the range of 20/80 to 95/5, a polymer blend wherein a chemical bond may exist between segment A and segment B, and the mixture thereof.

Other olefins than propylene as described above include straight-chain monoolefins such as ethylene, 1-butene, 1-pentene, 1-hexene, 1-octene, 1-decene, 1-dodecene or the like; branched-chain monoolefins such as 3-methyl-1-butene, 4-methyl-1-pentene, 2-methyl-1-pentene or the like; cyclic olefins such as cyclopentene, cyclohexene, norbornene, 5-methyl-2-norbornene, 5-ethyl-2-norbornene, phenylnorbornene, indanylnorbornene or the like; chain polyenes such as 1,3-butadiene, isoprene, 1,4-hexadiene, 1,7-octadiene, 1,9-decadiene, 4-methyl-1,4-hexadiene, 5-methyl-1,4-hexadiene, 7-methyl-1,6-octadiene or the like; cyclic polyenes such as dicyclopentadiene, 5-methylene-2-norbornene, 5-ethylidene-2-norbornene or the like; styrenes such as styrene, vinylnaphthalene, α-methylstyrene or the like; substituted olefins and polyene derivatives such as 5-(N,N-diisopropylamino)-1-pentene, 4-trimethylsiloxy-1,6-heptadiene or the like; and vinyl compounds copolymerizable with an olefin such as vinylcyclohexane, vinyl chloride, methyl methacrylate, ethyl acrylate or the like. Of these olefins, ethylene and/or 1-butene is most preferably used.

In the present invention, segment A comprising a polymer based on propylene mainly gives stiffness to the propylene//propylene/olefin block copolymer, and segment B comprising a propylene/olefin random copolymer mainly gives impact resistance to the block copolymer.

Further, it is important to produce segment A having good particle morphology in the first polymerization step for the production of the propylene//propylene/olefin block copolymer having good particle morphology, by which manufacture of segment B is attained. Then, a weight ratio of units of other olefin(s) than propylene/units of propylene in both segments A and B and a weight ratio of both segments A and B are decided, taking both physical property and particle morphology of the polymer into consideration.

For imparting high stiffness to the propylene//propylene/olefin block copolymer, segment A is a polymer based on propylene comprising a propylene homopolymer or a propylene/olefin (other than propylene) random copolymer, preferably a propylene homopolymer or a propylene/ethylene random copolymer, wherein a weight ratio of units of other olefin(s) than propylene/units of propylene in the polymer chain is from 0/100 to 30/70, preferably 0/100 to 10/90, more preferably 0/100 to 5/95 and most preferably 0/100 to 3/97. More flexible polymer is demanded depending on the use. In that case, the content of other olefin(s) than propylene in the random copolymer of propylene/other olefin(s) than propylene which constitutes segment A is preferably as much as possible within the above range, preferably 3 to 20% by weight, taking the physical property and particle morphology of the polymer into consideration.

For imparting impact-resistance, especially impact-resistance at low temperature to the propylene//propylene/olefin block copolymer, it is preferable that segment B comprises a propylene/olefin random copolymer wherein a weight ratio of units of other olefin(s) than propylene/units of propylene in the polymer chain is from 5/95 to 95/5, preferably 20/80 to 75/25, and more preferably 25/75 to 65/35. Preferable other olefins than propylene are straight-chain monoolefins and diolefins as recited above. In particular, ethylene, butene-1 or the mixture thereof is preferable.

In view of a balance of stiffness and impact-resistance of the propylene//propylene/olefin block copolymer, a weight ratio of segment A/segment B is in the range of 20/80 to 95/5, preferably 20/80 to 80/20 and more preferably 20/80 to 70/30. For preparing the polymer of higher stiffness in the range not impairing the impact-resistance, the weight ratio is preferably in the range of 85/15 to 95/5. For preparing more flexible polymer, the weight ratio is preferably in the range of 20/80 tO 60/40.

In case where a stress-whitening resistance on impacting, stress-whitening resistance on bending or reduction of mold shrinkage factor is required for the propylene//propylene/olefin block copolymer, a ratio ($[\eta]_A/[\eta]_B$) an intrinsic viscosity of segment A ($[\eta]_A$) to an intrinsic viscosity of segment B ($[\eta]_B$) is controlled to preferably 0.5–2, more preferably 0.6–1.8 and most preferably 0.6–1.6.

The intrinsic viscosity of segment B ($[\eta]_B$) is obtained from the intrinsic viscosity of segment A ($[\eta]_A$) which can be measured directly, an intrinsic viscosity of the propylene//propylene/olefin block copolymer ($[\eta]_W$) and a weight fraction of segment A ($W_A$) in the propylene//propylene/olefin block copolymer, in accordance with following equation:

$$[\eta]_B=([\eta]_W-W_A\cdot[\eta]_A)/(1-W_A).$$

The first process for the production of the present propylene//propylene/olefin block copolymer comprises carrying out in sequence the following steps (A) and (B):

(A) a first polymerization step wherein propylene alone or a mixture of propylene and other olefin(s) than propylene is polymerized in the presence of a catalyst system for olefin polymerization comprising a supported metallocene catalyst and an organoaluminum compound, to produce the segment A comprising a polymer based on propylene, and (B) a second polymerization step wherein propylene and other olefin(s) than propylene are copolymerized in the presence of the polymer based on propylene containing the catalyst system for olefin polymerization from the first polymerization step, to produce the segment B comprising the propylene/olefin random copolymer.

Another process of producing the propylene//propylene/olefin block copolymer comprises carrying out in sequence the same first polymerization step as in (A) above and the same second polymerization step as in (B) above, using the catalyst system for olefin polymerization which comprises the preactivated catalyst comprising a granular product wherein 0.01–100 kg of the olefin prepolymer per kg of the supported metallocene catalyst is supported on the supported metallocene catalyst, and an organoaluminum compound, in place of the catalyst system for olefin polymerization comprising the supported metallocene catalyst and the organoaluminum compound in the first polymerization step (A).

The term "preactivation" as used herein about the catalyst means that various activities of the catalyst on the polymerization of olefin(s) including propylene, for example, a polymerization activity expressed by the amount of olefin(s) polymerized per unit weight of an effective component of the catalyst and the activities acting on stereoregularity and crystallizability of the olefin polymer produced are preactivated prior to the run polymerization of olefin. The term "repolymerization" of olefin means prepolymerizing small amounts of olefin in the presence of the catalyst prior to the run polymerization of olefin for the preactivation of the catalyst. The term "olefin prepolymer" means an olefin polymer which has been prepolymerized prior to the run polymerization of olefin.

In the present invention, the supported metallocene catalyst comprises a solid product wherein a reaction product of an organic transition metal compound having two π-electron conjugated ligands crosslinked each other, what is called crosslinked metallocene compound (called hereafter "crosslinked metallocene compound") and aluminoxane is supported on an inorganic finely particulate support, and also the solid product is solid particles containing 0.01–5% by weight of a transition metal derived from the crosslinked metallocene compound and 0.1–50% by weight of aluminum derived from aluminoxane and further having a molar ratio of aluminum/transition metal in the supported metallocene catalyst in the range of 1–1,000.

The content of the transition matal in the supported metallocene catalyst and the molar ratio of aluminum/transition metal act on the polymerization activity of olefin(s). If the content of the transition metal is too little, no practical polymerization activity of olefin is obtained. If the content is more than is necessary, no polymerization activity according thereto is obtained. The content of the transition metal in the supported metallocene catalyst in the range of 0.01–5% by weight can provide practically sufficient olefin polymerization activity, but the range of 0.03–2% by weight is preferable. The content of aluminum is 0.1–50% by weight, preferably 1–40% by weight. The molar ratio of aluminum/transition metal is controlled to the range of 1–1,000, preferably 5–700, and more preferably 10–500.

Further, the supported metallocene catalyst has a specific peak at 1426 cm$^{-1}$ in the infrared (IR) absorption spectrum determined by an infrared reflection method, using an infrared absorption apparatus with a resolution of 4 cm$^{-1}$ equipped with a diffuse reflection accessory as a heating cell (Nicolet 60SXR, manufactured by Japan Optics Co., Ltd.) and filling a sample in a diffuse reflection accessory in a $N_2$ sealed glow box. The presence of this peak and the strength demonstrate the improved polymerization activity of olefin.

The supported metallocene catalyst as described above is prepared by carrying out in sequence the following steps of:

(a) reacting the crosslinked metallocene compound with aluminoxane in an inert solvent, (b) contacting a reaction product formed in step (a) with an inorganic finely particulate support at a temperature of 85–150° C. in the presence of an inert solvent, and (c) washing at least two times a slurry containing the solid product formed in step (b) with an aliphatic hydrocarbon at a temperature of −50 to 50° C.

The preactivated catalyst as described above is prepared by carrying out, subsequent to the above step (c), step (d) wherein the supported metallocene catalyst prepared in step (c) is contacted with olefin(s) to prepolymerize the olefin(s) and 0.01–100 kg of the olefin prepolymer per kg of the supported metallocene catalyst is further supported.

The metallocene compounds used for supported metallocene catalysts and preactivated catalysts are represented by the following formula (1):

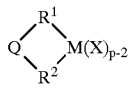
(1)

wherein M represents a transition metal, p represents a valence of a transition metal, X may be the same or different and each represents a hydrogen atom, a halogen atom or a hydrocarbyl radical, $R^1$ and $R^2$ may be the same or difference and each represents a π-electron conjugated ligand coordinated to M, and Q represents a divalent radical crosslinking two π-electron conjugated ligands $R^1$ and $R^2$.

The transition metals represented by M in formula (1) include, for example, Y, Sm, Zr, Ti, Hf, V, Nb, Ta and Cr. Preferable is Y, Sm, Zr, Ti or Hf, and particularly preferable is Zr or Hf.

The π-electron conjugated ligands represented by $R^1$ and $R^2$ in formula (1) include ligands which have a η-cyclopentadienyl structure, a T-benzene structure, a η-cycloheptatrienyl structure and a η-cyclooctatetraene structure. Particularly preferable is a ligand having a η-cyclopentadienyl structure.

The ligands having a η-cyclopentadienyl structure include, for example, a cyclopentadienyl group, an indenyl group, a hydrogenated indenyl group and a fluorenyl group. These groups may be further substituted with a hydrocarbon group such as halogen, alkyl, aryl, aralkyl, alkoxy or aryloxy, a hydrocarbyl radical-containing silyl group such as trialkylsilyl, or a linear or cyclic alkylene group.

The groups represented by Q crosslinking $R^1$ and $R^2$ in formula (1) include any divalent radicals, but not limited thereto, for example, a straight or branched chain alkylene group, an unsubstituted or.substituted cycloalkylene group, an alkylidene group, an unsubstituted or substituted cycloalkylidene group, an unsubstituted or substituted phenylene group, a silylene group, a dialkyl-substituted silylene group, a germyl group, a dialkyl-substituted germyl group and the like.

The above crosslinked metallocene compounds include, for example, dimethylsilylene(3-t-butylcyclopentadienyl) (fluorenyl)zirconium dichloride, dimethylsilylene(3-t-butylcyclopentadienyl)(fluorenyl)hafnium dichloride, rac-ethylenebis(indenyl)zirconium dimethyl, rac-ethylenebis (indenyl)zirconium dichloride, rac-dimethylsilylenebis (indenyl)zirconium dimethyl, rac-dimethylsilylenebis (indenyl)zirconium dichloride, rac-ethylenebis (tetrahydroindenyl)zirconium dimethyl, rac-dimethylgermylbis(indenyl)zirconium dimethyl, rac-dimethylgermylbis(indenyl)zirconium dichloride, rac-ethylenebis(tetrahydroindenyl)zirconium dimethyl, rac-ethylenebis(tetrahydroindenyl)zirconium dichloride, rac-dimethylsilylenebis(tetrahydroindenyl)zirconium dimethyl, rac-dimethylsilylenebis(tetrahydroindenyl)zirconium dichloride, rac-dimethylgermylbis(tetrahydroindenyl) zirconium dimethyl, rac-dimethylgermylbis (tetrahydroindenyl)zirconium dichloride, rac-dimethylsilylenebis(2-methyl-4,5,6,7-tetrahydroindenyl) zirconium dichloride, rac-dimethylsilylenebis(2-methyl-4,5, 6,7-tetrahydroindenyl)zirconium dimethyl, rac-dimethylgermylbis(2-methyl-4,5,6,7-tetrahydroindenyl) zirconium dichloride, rac-dimethylgermylbis(2-methyl-4,5, 6,7-tetrahydroindenyl)zirconium dimethyl, rac-ethylenebis (2-methyl-4,5,6,7-tetrahydroindenyl)hafnium dichloride, rac-dimethylsilylenebis(2-methyl-4-phenylindenyl) zirconium dichloride, rac-dimethylsilylenebis(2-methyl-4- phenylindenyl)zirconium dimethyl, rac-dimethylgermylbis (2-methyl-4-phenylindenyl)zirconium dichloride, rac-dimethylgermylbis(2-methyl-4-phenylindenyl)zirconium dimethyl, rac-dimethylsilylenebis(2-methyl-4-phenylindenyl)hafnium dichloride, rac-dimethylsilylenebis(2-methyl-4-naphthylindenyl)zirconium dimethyl, rac-dimethylsilylenebis(2-methyl-4-naphthylindenyl)hafnium dichloride, rac-dimethylgermylbis(2-methyl-4-naphthylindenyl)zirconium dimethyl, rac-dimethylgermylbis(2-methyl-4-naphthylindenyl)hafnium dichloride, rac-dimethylsilylenebis(2-methyl-4,5-benzindenyl)zirconium dichloride, rac-dimethylsilylenebis (2-methyl-4,5-benzindenyl)zirconium dimethyl, rac-dimethylgermylbis(2-methyl-4,5-benzindenyl)zirconium dichloride, rac-dimethylgermylbis(2-methyl-4,5-benzindenyl)zirconium dimethyl, rac-dimethylsilylenebis (2-methyl-4,5-benzindenyl)hafnium dichloride, rac-dimethylsilylenebis(2-ethyl-4-phenylindenyl)zirconium dichloride, rac-dimethylsilylenebis(2-ethyl-4-phenylindenyl)zirconium dimethyl, rac-dimethylgermylbis (2-ethyl-4-phenylindenyl)zirconium dichloride, rac-dimethylsilylenebis(2-ethyl-4-phenylindenyl)hafnium dichloride, rac-dimethylsilylenebis(2-methyl-4,6-diisopropylindenyl)zirconium dichloride, rac-dimethylsilylenebis(2-methyl-4,6-diisopropylindenyl) zirconium dimethyl, rac-dimethylgermylbis(2-methyl-4,6-diisopropylindenyl)zirconium dichloride, rac-dimethylsilylenebis(2-methyl-4,6-diisopropylindenyl) hafnium dichloride, dimethylsilylene(2,4-dimethylcyclopentadienyl)(3',5'-dimethylcyclopentadienyl) titanium dichloride, dimethylsilylene(2,4-dimethylcyclopentadienyl)(3',5'-dimethylcyclopentadienyl) zirconium dichloride, dimethylsilylene(2,4-dimethylcyclopentadienyl)(3',5'-dimethylcyclopentadienyl) zirconium dimethyl, dimethylgermyl(2,4-dimethylcyclopentadienyl)(3',5'-dimethylcyclopentadienyl) zirconium dichloride, dimethylgermyl(2,4-dimethylcyclopentadienyl)(3',5'-dimethylcyclopentadienyl) zirconium dimethyl, dimethylsilylene(2,4-dimethylcyclopentadienyl)(3',5'-dimethylcyclopentadienyl) hafnium dichloride, dimethylsilylene(2,4-dimethylcyclopentadienyl)(3',5'-dimethylcyclopentadienyl) hafnium dimethyl, dimethylsilylene(2,3,5-trimethylcyclopentadienyl)(2',4',5',-trimethylcyclopentadienyl)titanium dichloride, dimethylsilylene(2,3,5-trimethylcyclopentadienyl)(2',4',5'-trimethylcyclopentadienyl)zirconium dichloride, dimethylsilylene(2,3,5-trimethylcyclopentadienyl)(2',4',5'-trimethylcyclopentadienyl)zirconium dimethyl, dimethylgermyl(2,3,5-trimethylcyclopentadienyl)(2',4',5'-trimethylcyclopentadienyl)zirconium dichloride, dimethylgermyl(2,3,5-trimethylcyclopentadienyl)(2',4',5'-trimethylcyclopentadienyl)zirconium dimethyl, dimethylsilylene(2,3,5-trimethylcyclopentadienyl)(2',4',5'-trimethylcyclopentadienyl)hafnium dichloride, and dimethylsilylene(2,3,5-trimethylcyclopentadienyl)(2',4',5'-trimethylcyclopentadienyl)hafnium dimethyl.

Of the above-mentioned crosslinked metallocene compounds, particularly preferable are dimethylsilylene(3-t-butylcyclopentadienyl)(fluorenyl)zirconium dichloride, rac-dimethylsilylenebis(2-methyl-4-phenylindenyl) zirconium dichloride, rac-dimethylgermylbis(2-methyl-4-phenylindenyl)zirconium dichloride, rac-dimethylgermylbis (2-methyl-4-phenylindenyl)zirconium dichloride, rac-dimethylsilylenebis(2-methyl-4-naphthylindenyl) zirconium dichloride, rac-dimethylgermylbis(2-methyl-4-naphthylindenyl)zirconium dichloride, rac- dimethylsilylenebis(2-methyl-4,5-benzindenyl)zirconium dichloride, rac-dimethylgermylbis(2-methyl-4,5-benzindenyl)zirconium dichloride, rac-dimethylsilylenebis (2-ethyl-4-phenylindenyl)zirconium dichloride, rac-dimethylgermylbis(2-ethyl-4-phenylindenyl)zirconium dichloride, rac-dimethylsilylenebis(2-methyl-4,6-diisopropylindenyl)zirconium dichloride, rac-dimethylgermylbis(2-methyl-4,6-diisopropylindenyl) zirconium dichloride, dimethylsilylene(2,4-dimethylcyclopentadienyl)(3',5'-dimethylcyclopentadienyl) zirconium dichloride, dimethylsilylene(2,4-dimethylcyclopentadienyl)(3',5'-dimethylcyclopentadienyl) zirconium dimethyl, dimethylgermyl(2,4-dimethylcyclopentadienyl)(3',5'-dimethylcyclopentadienyl) zirconium dichloride, dimethylgermyl(2,4-dimethylcyclopentadienyl)(3',5'-dimethylcyclopentadienyl) zirconium dimethyl, dimethylsilylene(2,4-dimethylcyclopentadienyl)(3',5'-dimethylcyclopentadienyl) hafnium dichloride, dimethylsilylene(2,4-dimethylcyclopentadienyl)(3',5'-dimethylcyclopentadienyl) hafnium dimethyl, dimethylsilylene(2,3,5-trimethylcyclopentadienyl)(2',4',5',-trimethylcyclopentadienyl )zirconium dichloride, dimethylsilylene(2,3,5-trimethylcyclopentadienyl)(2',4',5'-trimethylcyclopentadienyl) zirconium dimethyl, dimethylgermyl (2,3, 5-trimethylcyclopentadienyl) (2',4',5'-trimethylcyclopentadienyl)zirconium dichloride, dimethylgermyl (2,3,5-trimethylcyclopentadienyl)(2',4',5'-trimethylcyclopentadienyl)zirconium dimethyl, dimethylsilylene(2,3,5-trimethylcyclopentadienyl)(2',4',5'-trimethylcyclopentadienyl)hafnium dichloride, and dimethylsilylene(2,3,5-trimethylcyclopentadienyl)(2',4',5'-trimethylcyclopentadienyl)hafnium dimethyl.

Most preferable crosslinked metallocene compounds are dimethylsilylene(2,3,5-trimethylcyclopentadienyl)(2',4',5'-trimethylcyclopentadienyl)zirconium dichloride, dimethylgermyl(2,3,5-trimethylcyclopentadienyl)(2',4',5'-trimethylcyclopentadienyl)zirconium dichloride, dimethylsilylene(2,3,5-trimethylcyclopentadienyl)(2',4',5'-trimethylcyclopentadienyl)hafnium dichloride and rac-dimethylsilylene(2-methyl-4-phenylindenyl)zirconium dichloride.

The crosslinked metallocene compounds may contain their meso compounds corresponding to the above-recited racemic compounds, if they are as small as 5 mol % or less.

Aluminoxanes which are reacted with the above crosslinked metallocene compounds in step (a) above are represented by the following formula (2) or (3).

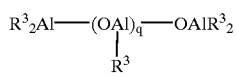

(2)

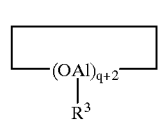

(3)

wherein $R^3$ is a hydrocarbyl radical of 1 to 6 carbons, preferably 1 to 4 carbons, e.g., an alkyl group such as methyl, ethyl, propyl, butyl, isobutyl, pentyl, hexyl, etc.; an alkenyl group such as allyl, 2-methylallyl, propenyl, isopropenyl, 2-methyl-1-propenyl, butenyl, etc.; a cycloalkyl group such as cyclopropyl, cyclobutyl, cyclopentyl, cyclohexyl, etc.; and an aryl group, etc.; and each $R^3$ may be the same or different. Of these groups, an alkyl group is preferable and methyl is most preferable. q is an integer of 4 to 30, preferably 6 to 30, and most preferably 8 to 30.

As aluminoxanes, a solution of aluminoxane in a commercially available organic solvent can be used. Further, aluminoxanes can be prepared under known various conditions. The following methods for the preparation of aluminoxanes can be concretely illustrated:

A method of reacting a trialkyl aluminum, e.g., trimethyl aluminum, triisobutyl aluminum or the mixture thereof, directly with water in an organic solvent such as toluene, ether, etc.;

A method of reacting a trialkyl aluminum, e.g., trimethyl aluminum, triisobutyl aluminum or the mixture thereof, with salts containing crystal water, e.g., copper sulfate hydrate and aluminum sulfate hydrate; and A method of reacting water impregnated in silica gel or the like, with a trialkyl aluminum, e.g., trimethyl aluminum, triisobutyl aluminum, separately or simultaneously or successively.

Even if unreacted trialkyl aluminum remains in the aluminoxane prepared by these methods, there is no trouble especially.

In step (a), 10–1,000 mols, preferably 20–500 mols (in terms of an aluminum atom) of aluminoxane per mol of the crosslinked metallocene compound are reacted in an inert solvent at a temperature of −50 to 100° C., preferably 0 to 50° C. for one minute to 10 hrs, preferably 3 minutes to 5 hrs to prepare a reaction product of the crosslinked metallocene compound and aluminoxane.

The use of inert solvents is preferable in proceeding the reaction uniformly and efficiently. There is no restriction especially in the amount of the inert solvent used, but usually about 10–10,000 liters, preferably about 10–1,000 liters are used per mol of the metallocene compound.

The inert solvents used in the above reaction include, for example, aromatic hydrocarbons such as benzene, toluene, xylene, cumene, etc.; aliphatic hydrocarbons such as butane, tetramethylbutane, pentane, ethylpentane, trimethylpentane, hexane, methylhexane, ethylhexane, dimethylhexane, heptane, methylheptane, octane, nonane, decane, hexadecane, octadecane, etc.; alicyclic hydrocarbons such as cyclopentane, methylcyclopentane, cyclohexane, cyclooctane, etc.; halogenated hydrocarbons wherein said aromatic hydrocarbons, said aliphatic hydrocarbons or said alicyclic hydrocarbons are substituted by halogen; and the mixtures thereof. Ethers such as ethylether, tetrahydrofuran, etc. can also be used. Preferable inert solvents are aromatic hydrocarbons. Further, commercially available solvents for aluminoxane solution may be used in the reaction as such or in combination with other aromatic hydrocarbons or the like.

In step (b) which follows step (a), the reaction product of the crosslinked metallocene compound and aluminoxane prepared in step (a) is contacted with an inorganic finely particulate support at a temperature of 85–150° C. in the presence of the inert solvent used as a reaction solvent in step (a) to produce a solid product wherein the reaction product is supported on the inorganic finely particulate support. In this contact reaction, an additional inert solvent may be added as the need arises.

A ratio of the reaction product of the crosslinked metallocene compound and aluminoxane prepared in step (a) to the inorganic finely particulate support is 1 to 1,000 kg, preferably 5 to 500 kg of the inorganic finely particulate support per mol of the transition metal atom in the reaction product. The amount of inert solvent used is 10–10,000 liters, preferably 10–1,000 liters per mol of the transition metal atom in the reaction product.

The inorganic finely particulate supports contacted with the reaction product are inorganic compounds or the mixtures thereof and are granulated or spherical, solid fine particles having a particle size of 5–300 µm, preferably 10–200 µm. The specific surface of inorganic finely particulate supports is in the range of 50–1,000 m$^2$/g, preferably 100–700 m$^2$/g, and the pore volume is preferably in the range of 0.3–2.5 m$^3$/g.

Preferred inorganic finely particulate supports. are metal oxides, e.g., $SiO_2$, $Al_2O_3$, $MgO$, $TiO_2$, $ZrO$, etc., and the mixture thereof or the composite oxides thereof. The supports comprising $SiO_2$ or $Al_2O_3$ as a main component are especially preferable. More specific inorganic compounds include $SiO_2$, $Al_2O_3$, $MgO$, $SiO_2$—$Al_2O_3$, $SiO_2$—$MgO$, $SiO_2$—$TiO_2$, $SiO_2$—$Al_2O_3$—$MgO$, etc. $SiO_2$ is especially preferable.

These inorganic finely particulate supports are used after fired usually at a temperature of 100–1,000° C., preferably 300–900° C., most preferably 400–900° C. The amount adsorbed on the surface of the fired inorganic finely particulate support is not more than 0.1% by weight, preferably not more than 0.01% by weight. The content of hydroxyl group on the surface of the support is not less than 1.0% by weight, preferably 1.5–4.0% by weight, and more preferably 2.0–3.5% by weight. These inorganic finely particulate supports may be subjected to a contact treatment with an organoaluminum compound and/or a halogen-containing silicone compound, prior to the use.

The contact of the reaction product prepared in step (a) with the inorganic finely particulate support is performed at a temperature of 85–150° C., preferably 90–130° C., most preferably 95–120° C. for 5 minutes to 100 hrs, preferably 10 minutes to 50 hrs. In particular, the temperature condition is an important factor. The contact within the above temperature range can achieve high polymerization activity of the resultant catalyst for olefin polymerization, and high bulk density and good particle morphology of the propylene//propylene/olefin block copolymer produced using said catalyst in the polymerization of the propylene//propylene/olefin.

In the subsequent step (c), the solid product containing the inert solvent prepared in step (b) is washed at least two times with an aliphatic hydrocarbon at a temperature of −50 to 50° C. to prepare the supported metallocene catalyst comprising the solid product having the reaction product of the crosslinked metallocene compound and aluminoxane supported on the support.

The aliphatic hydrocarbons used for washing include aliphatic hydrocarbons recited above as inert solvents and these mixed solvents. Preferably, n-hexane, isopentane or the mixture thereof is used.

The methods for washing the solid product prepared in step (b) which can be employed in the invention include, for example, a method wherein after completion of step (b), an inert solvent is separated from a slurry comprising the inert solvent and the solid product, by filtration, centrifugal separation or decantation, etc. and the resultant solid product is washed with an aliphatic hydrocarbon, and a method wherein after completion of step (b), without separating an inert solvent from a slurry comprising the inert solvent and the solid product, an aliphatic hydrocarbon is added to separate a mixed solvent of the inert solvent and the aliphatic hydrocarbon in the same manner as described above and the resultant solid product is washed with an aliphatic hydrocarbon, or the like. The latter method is more preferable.

The washing of the solid product is repeated using 1–500 liters, preferably 10–100 liters of the aliphatic hydrocarbon per kg of the inorganic finely particulate support per washing, under the temperature condition of −50 to 50° C., preferably −30 to 40° C, most preferably −30 to 30° C., until no metallocene compound is dissolved out in the aliphatic hydrocarbon after washing. Washing at least two times, usually not less than four times is sufficient, but not limited thereto.

The temperature condition for washing is an important factor. Washing within the above temperature range can achieve high polymerization activity of the resultant catalyst for olefin polymerization, and high bulk specific gravity and good particle morphology of the propylene//propylene/olefin block copolymer produced using said catalyst in the polymerization of the propylene//propylene/olefin.

The supported metallocene catalysts prepared by the above-mentioned methods are used suitably for the manufacture of the present propylene//propylene/olefin block copolymer, in combination with the organoaluminum compounds. Further, they can be used as a catalyst system for usual olefin polymerization carried out by a gas phase polymerization process or a bulk polymerization process.

A granular preactivated catalyst wherein an olefin prepolymer is coated and supported on the solid product prepared in step (c) can be prepared by carrying out, subsequently to the above step (c), further step (d) wherein the supported metallocene catalyst prepared in step (c) is contacted with an olefin to prepolymerize the olefin and 0.01–100 kg of the olefin prepolymer per kg of the supported metallocene catalyst are further supported.

Olefin prepolymers supported on the preactivated catalyst include homopolymers and copolymers of olefin(s) of 2–20 carbons, e.g., ethylene, propylene, 1-butene, 1-pentene, 4-methyl-1-pentene, 2-methyl-1-pentene, 1-hexene, 1-octene, 1-decene, 1-dodecene or the like. In particular, ethylene homopolymer, propylene homopolymer, and olefin copolymers based on ethylene or propylene are suitable. Further, these olefin prepolymers preferably have an intrinsic viscosity [η] of 0.1–10 dl/g, preferably 0.2–7 dl/g, as determined in decalin at 135° C.

A preferable process for the prepolymerization of olefin(s) is a process of introducing an olefin into a slurry of the solid product obtained in step (c), i.e., the supported metallocene catalyst dispersed in an aliphatic hydrocarbon, to prepolymerize the olefin. As the slurry of the solid product dispersed in the aliphatic hydrocarbon, a solid product obtained by washing at the final stage of step (c) may be used as such without separation from the aliphatic hydrocarbon, or a separated solid product may be used after redispersing in the same aliphatic hydrocarbon.

Prepolymerization of an olefin can be conducted in liquid phase using the olefin itself to be polymerized as a solvent or in gas phase without any solvent, but it is preferably carried out in the presence of an aliphatic hydrocarbon to control the polymerization of a small quantity of olefin and promote a homogenous reaction.

The prepolymerization of olefin in the aliphatic hydrocarbon is conducted by introducing 0.01 to 1,000 kg, preferably 0.1 to 500 kg of an olefin into a slurry comprising 0.005 to 5 m$^3$, preferably 0.01 to 1 m$^3$ of an aliphatic hydrocarbon per kg of the solid product, followed by polymerization of the olefin at a temperature of −50 to 100° C, preferably 0 to 50° C., for one minute to 50 hrs, preferably 3 minutes to 20 hrs.

In the prepolymerization of olefin as described above, there is no need to add a cocatalyst, a typical example of which is an organoaluminum compound such as trialkylaluminum and aluminoxane, since a reaction product of the crosslinked metallocene compound and aluminoxane has been supported on the solid product. The cocatalyst may be added, if desired. The amount of the cocatalyst added is preferably within the range of not more than 1,000 mols, preferably not more than 500 mols (in terms of an aluminum atom) per mol of a transition metal atom in the solid product. Further, the prepolymerization of olefin may be carried out in the presence of hydrogen to control the molecular weight of the resulting olefin prepolymer.

The preactivated catalysts as prepared above are used suitably for the manufacture of the present propylene//propylene/olefin block copolymers, as a catalyst system for olefin polymerization in combination with the organoaluminum compound, in the slurry state after completion of the prepolymerization of olefin, or in the resuspended state in an aliphatic hydrocarbon after completion of the prepolymerization of olefin and washing with the aliphatic hydrocarbon, or in the dry state by separation of the aliphatic hydrocarbon. Further, the catalyst system for olefin polymerization can be used in conventional olefin polymerization according to a slurry polymerization process, a gas phase polymerization process and a bulk polymerization process.

In the first polymerization step (A) of the present invention, propylene or a mixture of propylene and other olefins than propylene is polymerized in the presence of a catalyst system for olefin polymerization comprising a combination of the above supported metallocene catalyst and the organoaluminum compound or a combination of the above preactivated catalyst and the organoaluminum compound, to produce 20–95% by weight of segment A comprising the polymer based on propylene, based on the total weight of the polymer.

The organoaluminum compound constituting the catalyst system for olefin polymerization is a compound represented by the formula: $AlR^4_s R^5_t X_{3-(s+t)}$ wherein $R^4$ and $R^5$ are each independently a hydrocarbyl radical such as an alkyl group of 1–10 carbons, a cycloalkyl group, an aryl group or the like, a phenyl group which may have substituent(s) such as an alkoxy group, a fluorine atom, methyl, trifluorophenyl or the like, X is a halogen atom, and s and t are any integer satisfying $0 < s+t \leq 3$.

The organoaluminum compounds represented by the above formula include, e.g., a trialkylaluminum such as trimethylaluminum, triethylaluminum, triisopropylaluminum, tri-iso-butylaluminum, tri-n-butylaluminum, tri-n-hexylaluminum, tri-n-octylaluminum or the like; a dialkylaluminum halide such as dimethylaluminum chloride, dimethylaluminum bromide, diethylaluminum chloride, diisopropylaluminum chloride or the like; an alkylaluminum sesquihalide such as methylaluminum sesquichloride, ethylaluminum sesquichloride, ethylaluminum sesquibromide, isopropylaluminum sesquichloride or the like; and the mixtures of these two or more compounds. Preferable is a trialkylaluminum.

The amount of the organoaluminum compound used ranges from 1 to 5,000 mols (in terms of an Al atom in the organoaluminum compound), preferably 5 to 3,000 mols and most preferably 10 to 1,000 mols per mol of the transition metal atom in the catalyst system.

The amount of the supported metallocene catalyst or the preactivated catalyst used ranges is from $1 \times 10^{-10}$ to $1 \times 10^{-3}$ mol, preferably $1 \times 10^{-9}$ to $1 \times 10^{-4}$ mol in terms of the transition metal atom in the catalyst system, per liter of a polymerization volume. The amount of the catalyst used in the above range can keep an efficient and controlled reaction rate of a polymerization of olefin.

The term "polymerization volume" as used herein means a volume of a liquid phase section within a polymerization reactor in case of a liquid phase polymerization, and a volume of a gas phase section within a polymerization reactor in case of a gas phase polymerization.

In the second polymerization step (B) which follows the first polymerization step (A), a mixture of propylene and other olefin(s) than propylene is copolymerized in the presence of the polymer based on propylene containing the catalyst system for olefin polymerization to produce 80–95% by weight of segment B comprising the propylene/olefin random copolymer, based on the total weight of the polymer, thus producing the aimed propylene//propylene/olefin block copolymer.

A process for the polymerization of propylene and propylene/olefin employed in the first polymerization step and the second polymerization step can be known olefin polymerization processes. They include, for example, a slurry polymerization process wherein an olefin is polymerized in an inert solvent including an aliphatic hydrocarbon such as butane, pentane, hexane, heptane, isooctane or the like, an alicyclic hydrocarbon such as cyclopentane, cyclohexane, methylcyclohexane or the like, an aromatic hydrocarbon such as toluene, xylene, ethylbenzene or the like, and gasoline fraction, hydrogenated diesel oil and the like; a bulk polymerization process wherein an olefin itself such as propylene is used as a solvent; a gas phase polymerization process wherein an olefin is polymerized in gas phase; and a combination of these two or more polymerization processes. The catalysts used in the process for the production of the present invention can be employed suitably when the second polymerization step is performed by a gas phase polymerization, in particular, when both the first polymerization step and the second polymerization step are performed by a gas phase polymerization. This procedure can provide more efficient processes for the production of the copolymer with good performance and can produce excellent copolymers with well-balanced particle morphology and physical property.

The polymerization conditions for segment A comprising the polymer based on propylene in the first polymerization step (A) include the polymerization temperature of 20–120° C., preferably 40–100° C. and the polymerization pressure of atmospheric pressure to 9.9 MPa, preferably 0.59 to 5.0 MPa, in the presence of the above-described catalyst system for olefin polymerization. If necessary, a molecular weight modifier such as hydrogen may be used to control an intrinsic viscosity $[\eta]_A$ of segment A to a desired value.

The copolymerization conditions for segment B comprising the propylene/olefin random copolymer in the second polymerization step (B) include the polymerization temperature of 20–120° C., preferably 40–100° C. and the polymerization pressure of atmospheric pressure to 9.9 MPa, preferably 0.59 to 5.0 MPa. Similarly to the first polymerization step, if necessary, a molecular weight modifier such as hydrogen may be used to control an intrinsic viscosity $[\eta]_B$ of segment B to a desired value.

A polymerization ratio of segment A comprising the polymer based on propylene to segment B comprising the propylene/olefin/random copolymer is controlled by known processes which include the regulation of the polymerization time, polymerization pressure and polymerization temperature, respectively in the first polymerization step and the second polymerization step and the use of the regulator for the polymerization activity of the catalyst such as carbon monoxide and hydrogen sulfide upon copolymerization in the second polymerization step.

In the present invention, the first polymerization step (A) and the second polymerization step (B) may be carried out using one or more polymerization vessels for each step. Any of batch-wise, semi-continuous and continuous methods may be employed.

After completion of the copolymerization in the second polymerization step (B), unreacted monomer and hydrogen are separated from the polymerization system in case of the gas phase polymerization, or the solvent is separated after deactivation of the catalyst in case of the bulk polymerization and the slurry polymerization, thereby producing a granular propylene//propylene/olefin block copolymer.

The propylene//propylene/olefin block copolymer produced by the processes of the present invention may be incorporated, if necessary, with various additives such as antioxidants, ultraviolet absorbing agents, antistatic agents, nucleating agents, lubricants, flame retardants, antiblocking agents, colorants, inorganic or organic fillers, and further, various synthetic resins. Thereafter, the block copolymer is usually melt-kneaded at a temperature of 190–350° C. for about 20 seconds to 30 minutes using a melt-kneading machine and, if necessary, extruded into strands, and further cut into granulates, i.e., pellets which are served as a molding material.

The present invention is further illustrated by the following Examples and Comparative Examples.

Evaluation Items:

In the following Examples and Comparative Examples, the following various properties were evaluated.

(1) ZY: Olefin polymerization activity wherein the amount (g) of the polymerized olefin per gram of the transition metal Zr atom in the crosslinked metallocene compound was calculated from the amount of the supported metallocene catalyst used or the preactivated catalyst used and the amount of the produced polymer (Unit: g·polymer/g·Zr).

(2) BD: Bulk density of the produced polymer (Unit: kg/m$^3$).

(3) [η]: Intrinsic viscosity determined at 135° C. with tetralin (tetrachloronaphthalene) as a solvent using an automatic viscosity measuring apparatus (AVS2 type, manufactured by Mitsui Toatu K.K.) (Unit: dl/g).

(4) MFR: Value measured under condition 14 of Table 1 (load 21.18N, 230° C.) in accordance with JIS K7210 (Unit: g/10 min).

(5) Flexural modulus (MPa): Evaluated by flexural test. The resultant pellets were formed by an injection-molding method into a specimen 100 mm in length, 10 mm in width and 4 mm in thickness. The specimen was determined for the flexural modulus in accordance with JIS K7203.

(6) Izod impact strength (kJ/m$^2$): Value determined at 0° C. in accordance with JIS K7110 using a notched specimen prepared by an injection-molding method under the same condition as that of the flexural modulus.

(7) Haze (%): Measured in accordance with the method described in JIS K7105, using a specimen 1 mm in thickness. The specimen was prepared in the same manner as described for the measurement of flexural modulus.

EXAMPLE 1

(1) Preparation of Supported Metallocene Catalyst

A 4-L glass reaction vessel equipped with a stirrer and purged with nitrogen was charged with 1.37 liter (4.11 mol in terms of Al atom) of a toluene solution of methylaluminoxane (concentration: 3 mol/L, trade name: PMAO manufactured by Tosoh Akzo K.K.), and 16.6 mmol of a mixture of chiral dimethylsilylene(2,3,5-trimethylcyclopentadienyl)( 2',4',5'- trimethylcyclopentadienyl)zirconium dichloride and its meso form, dimethylsilylene(2,3,5-trimethylcyclopentadienyl)(2',3',5'-trimethylcyclopentadienyl)zirconium dichloride (1 mol % of meso content) as a crosslinked metallocene compound, and the mixture was reacted at 25° C. for 30 minutes while stirring to obtain a reaction product of the metallocene compound and aluminoxane.

To the reaction vessel was added 100 g of silica having an average particle size of 51 μm (SYLOPOL® 948, manufactured by Grace Davison) which had been fired at 750° C. under reduced pressure for 8 hrs, and the temperature of the vessel was elevated to 100° C. Then, the reaction product obtained above and the silica were contacted while stirring for 1 hour to give a slurry containing a solid product on which the above reaction product was supported.

After the reaction vessel was cooled to −10° C., 2 liters of n-hexane were added and the mixture was stirred for 5 minutes. The stirrer was stopped and the solvent was separated by decantation.

Subsequently, 2 liters of n-hexane were added to the vessel, while keeping the temperature of the vessel at −10° C. The mixture was stirred and washed for 5 minutes, the stirrer was stopped, and the washing solvent was separated by decantation. This washing operation was repeated four times to obtain a solid product on which the reaction product of the metallocene compound and aluminoxane was supported, i.e., a supported metallocene catalyst. Additional 2 liters of n-hexane were charged in the vessel and the supported metallocene catalyst was dispersed to form a slurry.

A part of the resulting supported metallocene catalyst/n-hexane slurry was taken, and the solvent was separated from the slurry, which was then dried under reduced pressure to give the supported metallocene catalyst. Analysis of the resultant catalyst showed that it contained 0.61% by weight of Zr derived from the crosslinked metallocene compound and 18.2% by weight of Al derived from aluminoxane and also that it had a speicific peak at 1426 cm$^{-1}$ in the IR spectrum, from which it was confirmed that the reaction product of the crosslinked metallocene compound and methylaluminoxane was supported on the silica.

The IR spectrum of the resulting supported metallocene catalyst is shown in FIG. 1.

No agglomerate with a particle size of 350 μm or more was observed in the resulting supported metallocene catalyst.

(2) Production of Preactivated Catalyst

A 4-dm$^3$ stainless reaction vessel equipped with a stirrer and purged with nitrogen was charged with 2 liters of n-hexane. The supported metallocene catalyst/n-hexane slurry prepared in (1) was transferred to the vessel kept at 0° C. While keeping the vessel at 0° C. with stirring, propylene gas was fed for 90 minutes at a rate of 0.15 mol/min to carry out the prepolymerization. The resulting propylene homopolymer was supported on the supported metallocene catalyst prepared in (1). During this prepolymerization reaction, unreacted propylene gas was discharged out of the vessel. After the prepolymerization time passed, the supply of propylene gas was stopped. While elevating the temperature of the vessel to 25° C., a gas phase in the reaction vessel was purged with nitrogen.

After the solvent was separated from the reaction mixture by decantation, 2 liters of n-hexane were added, the preactivated catalyst was stirred and washed for 5 minutes, and the washing solvent was separated by decantation. This washing operation was repeated four times. Additional 2 liters of n-hexane were added to the vessel and the resulting preactivated catalyst was dispersed in n-hexane to form a slurry.

A part of the resulting preactivated catalyst/n-hexane slurry was taken, and the solvent was separated from the slurry, which was then dried under reduced pressure to give a preactivated catalyst. Analysis of the resultant preactivated catalyst showed that 0.7 g of polypropylene per 1 g of the supported metallocene catalyst was supported.

(3) Production of Propylene//propylene/olefin Block Copolymer

A 3-L stainless gas phase polymerization reactor of a horizontal form (length/diameter=3), equipped with a stirrer and purged with nitrogen, was charged with 100 g of polypropylene powders. To the reactor was introduced with stirring 33 mg of the preactivated catalyst prepared in (2) and 0.2 mmol of triethyl aluminum (an n-hexane solution at a concentration of 1 mol/L). The temperature of the reactor was elevated to 50° C., and propylene was fed so as to maintain a pressure of the reactor at 1.87 MPa to continue a gas phase polymerization of propylene for 2 hours. After the polymerization time passed, the supply of a propylene gas was stopped. An unreacted propylene was discharged out of the system and the temperature of the reactor was lowered to 25° C. The polymer was taken from the reactor while leaving about 100 g of polypropylene particles therein. Subsequently, the preactivated catalyst was introduced in the same amount as in the first polymerization step, and the same operation as in the first polymerization step was repeated as the second propylene polymerization. The third propylene homopolymerization repeating once more the same operation as described above was completed to produce the segment A comprising a propylene homopolymer.

While leaving the resulting polymer in the polymerization reactor, the temperature of the reactor was elevated to 50° C. and an ethylene/propylene mixed gas (molar ratio=ethylene/propylene=94/6) was fed to the reactor so as to maintain the pressure at 1.6 MPa. A gas phase copolymerization of ethylene/propylene was continued for 1 hour. After the polymerization time passed, the supply of the ethylene/propylene mixed gas was stopped. Unreacted ethylene and propylene were then discharged out of the system and the temperature of the reactor was lowered to 25° C. From the polymerization reactor, 420 g of the resultant propylene//propylene/ethylene block copolymer were recovered.

After completion of the polymerization, neither generation of the polymer in lump within the opened reactor, i.e., reactor chunking, nor adhesion of the polymer on the wall surface of the reactor, i.e., reactor fouling was observed.

The resultant propylene//propylene/ethylene block copolymer had an ethylene content of 11.2% by weight, a Zr content of 0.66 ppm, an intrinsic viscosity $[\eta]_W$ of 1.44 dl/g, a melting point of 155° C. and BD (bulk density) of 360 kg/m$^3$.

Separately, the operation until the above first polymerization step was carried out under the same condition to produce 340 g of polypropylene having an intrinsic viscosity $[\eta]_A$ of 1.45 dl/g.

From the above result, it was calculated that segment A was 81% by weight, segment B was 19% by weight, an intrinsic viscosity $[\eta]_B$ of segment B was 1.40 dl/g and an ethylene content in segment B was 58.9% by weight. Further, the polymerization activity, ZY was calculated to be 1.5×10$^6$ g polymer/g Zr.

EXAMPLE 2

(1) Preparation of Supported Metallocene Catalyst

A slurry of the supported metallocene catalyst dispersed in isopentane was prepared in the same manner as in the preparation of the supported metallocene catalyst of Example 1(1), except that a reaction product of the metallocene compound and aluminoxane was contacted with silica at a temperature of 115° C. and that a solid product was washed at −5° C. with isopentane. Subsequently, separation of the solvent by filtration and drying under reduced pressure at a temperature of 30° C. gave a supported metallocene catalyst comprising solid particles.

Analysis of the resultant supported metallocene catalyst showed that it contained 0.58% by weight of Zr derived from the crosslinked metallocene compound and 17.0% by weight of Al derived from aluminoxane.

No formation of an agglomerated catalyst with a particle size of 350 μm or more was observed.

(2) Production of Propylene//propylene/olefin Block Copolymer

A 3-L stainless polymerization reactor equipped with a stirrer and purged with nitrogen was charged with 0.5 mmol of triethyl aluminum (an n-hexane solution at a concentration of 1 mol/L) and 1 liter of a liquefied propylene. After the temperature of the reactor was raised to 50° C., ethylene was introduced into the reactor so as to provide a partial pressure of 0.1 MPa. 23 mg of the supported metallocene catalyst prepared in (1) slurried in 2 ml of n-hexane were pressurized in the reactor together with 0.2 liter of a liquefied propylene and the polymerization was initiated. After initiation of the polymerization, the temperature of the reactor was kept at 50° C. and the bulk copolymerization of ethylene/propylene was continued for 2 hours. After the polymerization time passed, unreacted ethylene and propylene were discharged out of the system and the temperature of the reactor was cooled to 25° C.

While leaving the polymer based on propylene in the reactor, the temperature of the reactor was elevated to 50° C., a mixed gas of ethylene/propylene (molar ratio of ethylene/propylene=92/8) was fed to the reactor so as to keep the pressure of the reactor at 1.6 MPa and the gas phase copolymerization of ethylene/propylene was continued for one hour. After the polymerization time passed, the supply of an ethylene/propylene mixed gas was stopped.

Unreacted ethylene and propylene were discharged out of the system, the temperature of the reactor was lowered to 25° C. and 350 g of a propylene//propylene/ethylene block copolymer were recovered. After completion of the polymerization, neither generation of the polymer in lump within the opened reactor, i.e., reactor chunking, nor adhesion of the polymer on the wall surface of the reactor, i.e., reactor fouling was observed.

The resultant propylene//propylene/ethylene block copolymer had an ethylene content of 8.9% by weight, a Zr content of 0.38 ppm, an intrinsic viscosity $[\eta]_W$ of 1.39 dl/g, a melting point of 153° C. and BD (bulk density) of 370 kg/m$^3$.

Separately, the operation until the above first polymerization step was carried out under the same condition to produce 340 g of an ethylene/propylene copolymer based on propylene with an ethylene content of 0.2% by weight and an intrinsic viscosity $[\eta]_A$ of 1.41 dl/g.

From the above result, it was calculated that segment A was 86% by weight, segment B was 14% by weight, an intrinsic viscosity $[\eta]_B$ of segment B was 1.27 dl/g and an ethylene content in segment B was 62.3% by weight. The polymerization activity, ZY was calculated to be 2.6×10$^6$ g polymer/g Zr.

Comparative Example 1

A propylene//propylene/ethylene block copolymer was produced in the same manner as in Example 1, except that the supported metallocene catalyst used was prepared by changing the temperature upon contact of the reaction product with silica to 60° C. from 100° C. in the preparation of the supported metallocene catalyst in Example 1(1).

The preparation conditions and results for the supported metallocene catalyst and the preactivated catalyst are shown in Table 1. The preparation conditions and results for the propylene//propylene/ethylene block copolymer are shown in Table 2.

Comparative Example 2

A propylene//propylene/ethylene block copolymer was produced in the same manner as in Example 1, except that toluene was substituted for n-hexane as a solvent for washing the solid product in the preparation of the supported metallocene catalyst in Example 1(1) and that the amount of a preactivated catalyst used was 190 mg in terms of the supported metallocene catalyst in the production of the propylene//propylene/olefin block copolymer in Example 1(3), the preactivated catalyst being prepared by preactivating the supported metallocene catalyst as prepared above under the same condition as in Example 1(2).

The preparation conditions and results for the supported metallocene catalyst and the preactivated catalyst are shown in Table 1. The preparation conditions and results for the propylene//propylene/ethylene block copolymer are shown in Table 2.

EXAMPLE 3

(1) Preparation of Supported Metallocene Catalyst

A 2-L glass reaction vessel equipped with a stirrer and purged with nitrogen was charged with 0.58 liter (1.74 mol in terms of Al atom) of a toluene solution of methylaluminoxane (concentration: 3 mol/L, trade name: PMAO manufactured by Tosoh Akzo K.K.), and 6.96 mmol of a mixture of chiral dimethylsilylene(2,3,5-trimethylcyclopentadienyl)(2',4',5'-trimethylcyclopentadienyl)zirconium dichloride and its meso form, dimethylsilylene(2,3,5-trimethylcyclopentadienyl)(2',3',5'-trimethylcyclopentadienyl)zirconium dichloride (1 mol % of meso content) as a crosslinked metallocene compound, and the mixture was reacted at 50° C. for 60 minutes while stirring to obtain a reaction product of the metallocene compound and aluminoxane.

To the reaction vessel was added 50 g of silica having an average particle size of 51 μm (SYLOPOL® 948, manufactured by Grace Davison) which had been fired at 750° C. under reduced pressure for 8 hrs, and the temperature of the vessel was elevated to 110° C. Then, the reaction product obtained above and the silica were contacted while stirring for 1 hour to give a slurry containing a solid product on which the above reaction product was supported.

After the reaction vessel was cooled to −20° C., 1 liter of n-hexane was added and the mixture was stirred for 10 minutes. The stirrer was stopped and the solvent was separated by decantation.

Subsequently, 1 liter of n-hexane was added to the vessel, while keeping the temperature of the vessel at −20° C. The mixture was stirred and washed for 5 minutes, the stirrer was stopped, and the washing solvent was separated by decantation. This washing operation was repeated four times to obtain a solid product on which the reaction product of the metallocene compound and aluminoxane was supported, i.e., a supported metallocene catalyst. Additional 1 liter of n-hexane was charged in the vessel and the supported metallocene catalyst was dispersed to form a slurry.

A part of the resulting supported metallocene catalyst/n-hexane slurry was taken, and the solvent was separated from the slurry, which was then dried under reduced pressure to give the supported metallocene catalyst. Analysis of the resultant catalyst showed that it contained 0.46 % by weight of Zr derived from the crosslinked metallocene compound and 14.9% by weight of Al derived from methylaluminoxane.

No formation of an agglomerated catalyst with a particle size of 350 μm or more was observed.

(2) Production of Preactivated Catalyst

To a 2-L glass reaction vessel equipped with a stirrer and purged with nitrogen was transferred the supported metallocene catalyst/n-hexane slurry prepared in (1) and the temperature of the reaction vessel was controlled to 0° C. While keeping the vessel at 0° C. with stirring, propylene gas was fed for 80 minutes at a rate of 53.2 mmol/min to carry out a prepolymerization. The resulting propylene homopolymer was supported on the supported metallocene catalyst prepared above. During this prepolymerization reaction, unreacted propylene gas was discharged out of the vessel. After the prepolymerization time passed, the supply of propylene gas was stopped. While elevating the temperature of the vessel to 25° C., a gas phase in the reaction vessel was purged with nitrogen.

After the solvent was separated from the reaction mixture by decantation, 1 liter of n-hexane was added, the preactivated catalyst was stirred and washed for 5 minutes, and the washing solvent was separated by decantation. This washing operation was repeated five times. Additional 1 liter of n-hexane was added to the vessel and the resulting preactivated catalyst was dispersed in n-hexane to form a slurry.

The resulting preactivated catalyst/n-hexane slurry was separated by filtration and dried at 25° C. under reduced pressure to give a preactivated catalyst of solid particles.

Analysis of the resultant preactivated catalyst showed that 1.01 g of polypropylene per 1 g of the supported metallocene catalyst was supported.

(3) Production of Propylene//propylene/1-butene Block Copolymer

A 1.5-L stainless autoclave equipped with a stirrer and purged with nitrogen was charged with 0.8 liter of a liquefied propylene and 1.0 mmol of triethyl aluminum, and the mixture was stirred at 50° C. for 10 minutes. 70.3 mg of the supported metallocene catalyst prepared in (2) above and 0.2 liter of a liquefied propylene were added, and while keeping the internal temperature of the autoclave at 50° C., the polymerization was carried out for 35 minutes. After the polymerization time passed, unreacted propylene was discharged out of the system.

Subsequently, 0.5 mmol of triethyl aluminum was added to the polymerization reactor, the temperature of the reactor was kept at 50° C., a propylene/1-butene mixed gas (molar ratio of propylene/1-butene=26/74) was fed to the reactor so as to keep the pressure of the reactor at 0.6 MPa, and the gas phase polymerization of propylene/1-butene was continued for 345 minutes. The supply of a propylene/1-butene mixed gas was stopped and unreacted propylene/1-butene mixed gas was discharged out of the system. From the reactor, 264 g of the resulant propylene//propylene/1-butene block copolymer were recovered.

After completion of the polymerization, neither generation of the polymer in lump within the opened reactor, i.e., reactor chunking, nor adhesion of the polymer on the wall surface of the reactor, i.e., reactor fouling was observed.

The recovered propylene//propylene/1-butene block copolymer had a 1-butene content of 55% by weight, BD (bulk density) of 440 kg/m$^3$, an intrinsic viscosity $[\eta]_W$ of 1.15 dl/g, a melting point of 155° C. and 64° C.

For the resultant propylene//propylene/1-butene block copolymer, it was calculated that segment A was 32% by weight, segment B was 68% by weight and a 1-butene content in segment B was 81% by weight. The polymerization activity, ZY was calculated to be $1.8 \times 10^6$ g·polymer/g·Zr.

The production of block copolymer was carried out three times in total in the same manner as mentioned above, for evaluating the physical properties of the resultant block copolymers.

(4) Evaluation of Physical Properties of Propylene//propylene/1-butene Block Copolymer 0.05 part by weight of tetrakis[methylene(3,5-di-tert.butyl-4-hydroxyl.hydrocinnamate)]methane, 0.1 part by weight of tris(2,4-di-tert.butyl-phenyl)phosphite and 0.05 part by weight of calcium stearate, based on 100 parts by weight of the block copolymer as prepared above, were mixed. The mixture was pelletized using a single screw extruder having a screw diameter of 15 mm and set at an extrusion temperature of 190° C. to prepare a resin composition containing the above block copolymer as a base resin. An injection molded article formed from the resin composition was evaluated for the physical properties. The result is shown in Table 3.

EXAMPLE 4

(1) Production of Propylene/1-butene//propylene/1-butene Random Block Copolymer

A 1.5-L stainless autoclave equipped with a stirrer and purged with nitrogen was charged with 0.8 liter of a liquefied propylene/liquefied 1-butene mixed monomer (molar ratio of propylene/1-butene=86/14) and 1.0 mmol of triethyl aluminum, and the mixture was stirred at 40° C. for 10 minutes. 95.3 mg of the supported metallocene catalyst prepared in Example 3(2) and 0.2 liter of a liquefied propylene/liquefied 1-butene mixed monomer (with the same molar ratio as mentioned above) were added, and while keeping the internal temperature of the autoclave at 40° C., the polymerization was carried out for 40 minutes. Subsequently, unreacted mixed monomer was discharged out of the system.

Subsequently, 0.5 mmol of triethyl aluminum was added to the polymerization reactor, the temperature of the reactor was kept at 50° C., a propylene/1-butene mixed gas (molar ratio of propylene/1-butene=27/73) was fed to the reactor so as to keep the pressure of, the reactor at 0.6 MPa, and the gas phase copolymerization of propylene/1-butene was continued for 210 minutes. After the polymerization time passed, the supply of a propylene/1-butene mixed gas was stopped and unreacted propylene/1-butene mixed gas was discharged out of the system. From the reactor, 336 g of the resultant propylene/1-butene//propylene/1-butene random block copolymer were recovered.

After completion of the polymerization, neither generation of the polymer in lump within the opened reactor, i,e., reactor chunking, nor adhesion of the polymer on the wall surface of the reactor, i.e., reactor fouling was observed.

The recovered propylene/1-butene//propylene/1-butene random block copolymer had a 1-butene content of 56% by weight, RD (bulk density) of 440 kg/m$^3$, an intrinsic viscosity $[\eta]_W$ of 1.27 dl/g, a melting point of 122° C. and 60° C.

For the resultant propylene/1-butene//propylene/1-butene random block copolymer, it was calculated that segment A was 29% by weight, segment B was 71% by weight, a 1-butene content in segment A was 14% by weight and a 1-butene content in segment B was 73% by weight. The polymerization activity, ZY was calculated to be $1.7 \times 10^6$ g·polymer/g·Zr.

The production of block copolymer was carried out three times in total in the same manner as mentioned above, for evaluating the physical properties of the resultant block copolymers.

(2) Evaluation of Physical Properties of Propylene/1-butene//propylene/1-butene Random Block Copolymer A resin composition containing the above block copolymer as a base resin was prepared in the same manner as in Example 3, and an injection-molded article formed therefrom was evaluated for the physical properties. The result is shown in Table 3.

Comparative Example 3
(1) Production of Propylene/1-butene Copolymer

A 50-L autoclave completely purged with nitrogen was charged with 20.8 liters of n-hexane, 2.5 kg of 1-butene and 25 mmol of triisobutyl aluminum, the temperature of the mixture was elevated to 70° C., propylene was fed to provide a total pressure of 0.7 MPaG, and 25 mmol of triethyl aluminum and 0.125 mmol (in terms of Ti atom) of a titanium catalyst supported on magnesium chloride were added. While keeping the total pressure at 0.7 MPaG by continuously feeding propylene, polymerization was continued for 30 minutes. After the polymerization, the autoclave was vented and the polymer was recovered in a great amount of methanol and dried at 110° C. under reduced pressure for 12 hrs. The resultant polymer was 840 g, a 1-butene content in the polymer was 31% by weight, and a melting point was 110° C.

(2) Evaluation of Physical Properties of Propylene/1-butene Copolymer

A resin composition containing the above propylene/1-butene copolymer as a base resin was prepared in the same manner as in Example 3, and an injection-molded article formed therefrom was evaluated for the physical properties. The result is shown in Table 3.

Comparative Example 4
(1) Production of Propylene/1-butene Copolymer

A 1.5-L stainless autoclave equipped with a stirrer and purged with nitrogen was charged with 0.8 liter of a liquefied propylene/liquefied 1-butene mixed monomer (molar ratio of propylene/1-butene =76/24) and 1.0 mmol of triethyl aluminum, and the mixture was stirred at 40° C. for 10 minutes. 52.1 mg of the supported metallocene catalyst prepared in Example 3(2) and 0.2 liter of a liquefied propylene/liquefied 1-butene mixed monomer (with the same molar ratio as mentioned above) were added, and while keeping the internal temperature of the autoclave at 40° C., polymerization was carried out for 20 minutes. Subsequently, unreacted mixed monomer was discharged out of the system. 20 g of the polymer was recovered, but the recovered polymer was formed in lump. A 1-butene content in the polymer was 24% by weight.

Comparative Example 5
(1) Production of Propylene/ethylene Copolymer

A 1.5-L stainless autoclave equipped with a stirrer and purged with nitrogen was charged with 500 g of dried salt, and then with 2 mmol of triisobutyl aluminum and 500 ml of a liquefied propylene, and the mixture was stirred for 30 minutes. Subsequently, the liquefied propylene was discharged out of the system, and moisture adsorbed on the salt was removed by a vacuum replacement. Subsequently, 1 mmol of triisobutyl aluminum and 131 mg of the supported catalyst prepared in Example 3(2) were added, the mixture was kept at 30° C., a propylene/ethylene mixed monomer (molar ratio of propylene/ethylene=81.6/18.4) was fed to the polymerization reactor at a rate of 5000 ml/min so that the pressure within the reactor was kept at a constant pressure of 1 MPaG, and a copolymerization of propylene/ethylene was performed. The recovered propylene/ethylene copolymer was 76 g and bulk. An ethylene content in the polymer was 10% by weight.

In the production of the propylene//propylene/olefin block copolymers in the presence of the olefin polymerization catalyst systems containing the supported metallocene catalysts or preactivated catalysts according to the present invention, the production result exhibits the high polymerization activity ZY, as shown above in Examples 1 and 2, as compared with that using the supported metallocene catalyst or preactivated catalyst of Comparative Examples 1 and 2. The resultant propylene//propylene/olefin block copolymers have higher bulk density BD. There was neither adhesion of the polymer to the polymerization reactor, i.e., reactor fouling, nor generation of the polymer in lump, i.e., reactor chunking. They have very good particle morphology. Moreover, the amount of aluminoxane used is reduced. As shown in Examples 3 and 4, the specific copolymers have high BD, good particle morphology, and also excellent impact resistance, stiffness and transparency.

TABLE 1

|  | Example | | Comparative Example | |
| --- | --- | --- | --- | --- |
|  | 1 | 2 | 1 | 2 |
| Supported Catalyst | | | | |
| Step (a) | | | | |
| Al/metallocene molar ratio | 248 | 248 | 248 | 248 |
| Reaction temperature (° C.) | 25 | 25 | 25 | 25 |
| Reaction time (min) | 5 | 5 | 5 | 5 |
| Step (b) | | | | |
| Amount of support (g) | 100 | 100 | 100 | 100 |
| Contact temperature (° C.) | 100 | 115 | 60 | 100 |
| Contact time (hr) | 1 | 1 | 1 | 1 |

TABLE 1-continued

|  | Example | | Comparative Example | |
|---|---|---|---|---|
|  | 1 | 2 | 1 | 2 |
| Step (c) | | | | |
| Separation process | allowing to stand | allowing to stand | allowing to stand | allowing to stand |
| Washing solvent | n-hexane | i-pentane | n-hexane | toluene |
| Total amount of washing solvent used (1) | 10 | 10 | 10 | 10 |
| Washing temperature (° C.) | −10 | −5 | −10 | −10 |
| Total number of times of washing (times) | 5 | 5 | 5 | 5 |
| Supported catalyst | | | | |
| Zr content (%) | 0.61 | 0.58 | 0.44 | 0.16 |
| Al content (%) | 18.2 | 17.0 | 16.9 | 11.5 |
| >350 μm agglomerate content (%) | 0.0 | 0.0 | 0.0 | 0.0 |
| Preactivated catalyst Step (e) | | | | |
| Prepolymerizing olefin | Pr | — | Pr | Pr |
| Prepolymerization temperature (° C.) | 0 | — | 0 | 0 |
| Feeding rate (mol/min) | 0.15 | — | 0.15 | 0.15 |
| Feeding time (min) | 90 | — | 90 | 90 |
| Preactivated catalyst Olefin polymer | | | | |
| Supported amount (g/g) | 0.7 | — | 0.7 | 0.7 |

In the table, Pr stands for propylene.
(−) shows the absence of step (e).

TABLE 2

|  | Example | | Comparative Example | |
|---|---|---|---|---|
|  | 1 | 2 | 1 | 2 |
| First polymerization step (A) | | | | |
| Polymerization process | gas phase | bulk | gas phase | gas phase |
| Olefin | Pr | Pr—Et | Pr | Pr |
| Polymerization temperature (° C.) | 50 | 50 | 50 | 50 |
| Polymerization pressure (MPa) | 1.87 | 2.2 | 1.87 | 1.87 |
| Polymerization time (hr) | 2 | 2 | 2 | 2 |
| Segment A | | | | |
| Et content (wt %) | — | 0.2 | — | — |
| Intrinsic viscosity (dl/g) | 1.45 | 1.41 | 1.40 | 1.30 |
| Second polymerization step (B) | | | | |
| Polymerization process | gas phase | gas phase | gas phase | gas phase |
| Olefin | Pr—Et | Pr—Et | Pr—Et | Pr |
| Polymerization temperature (° C.) | 50 | 50 | 50 | 50 |
| Polymerization pressure (MPa) | 1.6 | 1.6 | 1.6 | 1.6 |
| Polymerization time (hr) | 1 | 1 | 1 | 1 |
| Segment B | | | | |
| Et content (wt %) | 58.9 | 62.3 | 64.9 | 67.8 |
| Intrinsic viscosity (dl/g) | 1.40 | 1.27 | 1.40 | 1.35 |
| Results of whole copolymerization | | | | |
| Polymerization activity (ZY) (g/gZr) | $1.5 \times 10^6$ | $2.6 \times 10^6$ | $7.7 \times 10^5$ | $1.0 \times 10^6$ |
| Generation of reactor chunking | No | No | No | No |
| Generation of reactor fouling | No | No | No | No |
| Block Copolymer | | | | |
| Segment A (wt %) | 81 | 86 | 84.6 | 82 |
| Segment B (wt %) | 19 | 14 | 15.4 | 18 |
| Et content (wt %) | 11.2 | 8.9 | 10.0 | 12.2 |

TABLE 2-continued

|  | Example | | Comparative Example | |
|---|---|---|---|---|
|  | 1 | 2 | 1 | 2 |
| Intrinsic viscosity (dl/g) | 1.44 | 1.39 | 1.40 | 1.31 |
| Bulk density (BD) (kg/m$^3$) | 360 | 370 | 320 | 300 |

In the table, Pr stands for propylene and Et stands for ethylene.

TABLE 3

|  | Example 3 | Example 4 | Comparative Example 3 |
|---|---|---|---|
| MFR (g/10 min) | 22 | 12 | 5 |
| Flexural modulus (MPa) | 310 | 300 | 240 |
| Izod impact strength, 0° C. (kJ/m$^2$) | 25 | 25 | 10 |
| Haze (%) | 10 | 7 | 13 |

Industrial Applicability

The propylene//propylene/olefin block copolymers of the present invention are excellent in impact resistance, stiffness, transparency and heat-sealing properties at low temperature, and can be used suitably in the use application for which various characteristics are required. According to the present processes, the copolymers having good BD and particle morphology can be produced efficiently.

What is claimed is:

1. In a process of producing a propylene//propylene/olefin block copolymer which comprises 20–95% by weight of segment A comprising a polymer based on propylene and 80–5% by weight of segment B comprising a propylene/olefin random copolymer, said process being carried out by the following steps (A) and (B) in sequence:
(A) a first polymerization step wherein propylene or a mixture of propylene and olefin(s) other than propylene is polymerized in the presence of a catalyst system for olefin polymerization comprising a supported metallocene catalyst and an organoaluminum compound, to produce the segment A comprising a polymer based on propylene wherein a weight ratio of units of olefin(s) other than propylene/units of propylene in the polymer chain is from 0/100 to 30/70, and
(B) a second polymerization step wherein a mixture of propylene and olefin(s) other than propylene is copolymerized in the presence of the polymer based on propylene containing the catalyst system for olefin polymerization from the first polymerization step, to produce the segment B comprising the propylene/olefin random copolymer wherein a weight ratio of units of propylene/units of olefin(s) other than propylene in the polymer chain is from 5/95 to 95/5,
the improvement comprising the supported metallocene catalyst being prepared by carrying out in sequence the following steps of:
(a) reacting an aluminoxane with an organic transition metal compound having two π-electron conjugated ligands crosslinked each other in an inert solvent,
(b) contacting a reaction product formed in step (a) with an inorganic finely particulate support in an inert solvent at a temperature of 85–150° C., and
(c) washing at least two times a slurry containing the solid product formed in step (b) with an aliphatic hydrocarbon at a temperature of −50 to 50° C. to prepare the supported metallocene catalyst.

2. The process of producing the propylene//propylene/olefin block copolymer set forth in claim 1, characterized in that a weight ratio of units of other olefin(s) than propylene/units of propylene in the polymer based on propylene produced in the first polymerization step is from 0/100 to 10/90.

3. The process set forth in claim 1 wherein the supported metallocene catalyst contains 0.01–5% by weight of a transition metal derived from an organic transition metal compound and 0.1–50% by weight of aluminum derived from aluminoxane.

4. The process set forth in claim 1 wherein the inorganic finely particulate support has an average particle size of 5–300 μm.

5. The process set forth in claim 1 wherein the inert solvent is an aromatic hydrocarbon.

6. The process set forth in claim 1 wherein the aliphatic hydrocarbon is n-hexane or isopentane.

7. In a process of producing a propylene//propylene/olefin block copolymer which comprises 20–95% by weight of segment A comprising a polymer based on propylene and 80–5% by weight of segment B comprising a propylene/olefin random copolymer, said process being carried out by the following steps (A) and (B) in sequence:
(A) a first polymerization step wherein propylene alone or a mixture of propylene and olefin(s) other than propylene is polymerized in the presence of a catalyst system for olefin polymerization comprising a granular preactivated catalyst and an organoaluminum compound, to produce the segment A comprising a polymer based on propylene wherein a weight ratio of units of olefin(s) other than propylene/units of propylene in the polymer chain is from 0/100 to 30/70, and
(B) a second polymerization step wherein a mixture of propylene and olefin(s) other than propylene is copolymerized in the presence of the polymer based on propylene containing the catalyst system for olefin polymerization from the first polymerization step, to produce the segment B comprising the propylene/olefin random copolymer wherein a weight ratio of units of propylene/units of olefin(s) other than propylene in the polymer chain is from 5/95 to 95/5,
the improvement comprising the granular preactivated catalyst being prepared by carrying out in sequence the following steps of:
(a) reacting an aluminoxane with an organic transition metal compound having two π-electron conjugated ligands crosslinked each other in an inert solvent,
(b) contacting a reaction product formed in step (a) with an inorganic finely particulate support in an inert solvent at a temperature of 85–150° C.,
(c) washing at least two times a slurry containing the solid product formed in step (b) with an aliphatic hydrocarbon at a temperature of −50 to 50° C., to prepare a supported metallocene catalyst, and
(d) contacting the supported metallocene catalyst prepared in step (c) with an olefin to prepolymerize the olefin and to form the granular preactivated catalyst, whereby 0.01–100 kg of the olefin prepolymer per kg of the supported metallocene catalyst is further supported on the supported metallocene catalyst.

8. The process of producing the propylene//propylene/olefin block copolymer set forth in claim 7, characterized in that a weight ratio of units of other olefin(s) than propylene/units of propylene in the polymer based on propylene produced in the first polymerization step is from 0/100 to 10/90.

9. The process set forth in claim 7 wherein the supported metallocene catalyst contains 0.01–5% by weight of a transition metal derived from an organic transition metal compound and 0.1–50% by weight of aluminum derived from aluminoxane.

10. The process set forth in claim 7 wherein the inorganic finely particulate support has an average particle size of 5–300 $\mu$m.

11. The process set forth in claim 7 wherein the inert solvent is an aromatic hydrocarbon.

12. The process set forth in claim 7 wherein the aliphatic hydrocarbon is n-hexane or isopentane.

13. The process set forth in claim 7 wherein an contact of the supported metallocene catalyst with an olefin in step (d) is performed by introducing an olefin into a slurry of the supported metallocene catalyst prepared in step (c) and dispersed in an aliphatic hydrocarbon.

14. The process set forth in claim 7 wherein the olefin to be prepolymerized is selected from ethylene, propylene, 3-methyl-1-butene and the mixture thereof.

15. A propylene//propylene/olefin block copolymer which comprises 20–95% by weight of segment A comprising a polymer based on propylene and 80–5% by weight of segment B comprising a propylene/olefin random copolymer, and which is obtainable by carrying out in sequence the following steps (A) and (B):

(A) a first polymerization step wherein propylene alone or a mixture of propylene and other olefin(s) than propylene is polymerized in the presence of a catalyst system for olefin polymerization comprising a supported metallocene catalyst and an organoaluminum compound, to produce the segment A comprising a polymer based on propylene wherein a weight ratio of units of other olefin(s) than propylene/units of propylene in the polymer chain is from 0/100 to 30/70, and (B) a second polymerization step wherein a mixture of propylene and other olefin(s) than propylene is copolymerized in the presence of the polymer based on propylene containing the catalyst system for olefin polymerization from the first polymerization step, to produce the segment B comprising the propylene/olefin random copolymer wherein a weight ratio of units of propylene/units of other olefin(s) than propylene in the polymer chain is from 5/95 to 95/5, the supported metallocene catalyst being prepared by carrying out in sequence the following steps of:
  (a) reacting an aluminoxane with an organic transition metal compound having two $\pi$-electron conjugated ligands crosslinked each other in an inert solvent,
  (b) contacting a reaction product formed in step (a) with an inorganic finely particulate support in an inert solvent at a temperature of 85–150° C., and
  (c) washing at least two times a slurry containing the solid product formed in step (b) with an aliphatic hydrocarbon at a temperature of –50 to 50° C.

16. The propylene//propylene/olefin block copolymer set forth in claim 15, characterized in that a weight ratio of units of other olefin(s) than propylene/units of propylene in the polymer based on propylene produced in the first polymerization step is from 0/100 to 10/90.

* * * * *